United States Patent

[11] 3,563,288

| [72] | Inventor | Roy D. Brownell<br>Aurora, Ill. |
|---|---|---|
| [21] | Appl. No. | 784,986 |
| [22] | Filed | Nov. 19, 1968 |
| [45] | Patented | Feb. 16, 1971 |
| [73] | Assignee | Baldwin-Lima-Hamilton Corporation<br>Chicago, Ill. |

[54] TREE-HARVESTING AND -PROCESSING DEVICES
18 Claims, 3 Drawing Figs.

[52] U.S. Cl............................................. 144/309,
144/2, 144/3, 144/208, 83/661
[51] Int. Cl.................................................. A01g 23/02
[50] Field of Search............................... 144/2(21),
3(4), 34, 208(3.5), 34(309); 83/39, 661, 675,
596, 426

[56] References Cited
UNITED STATES PATENTS

| 1,355,449 | 10/1920 | Campbell...................... | 83/661 |
| 2,205,036 | 6/1940 | Hamel............................ | 83/596 |
| 2,581,479 | 1/1952 | Grasham....................... | 144/208R |
| 2,948,311 | 8/1960 | McCollum..................... | 144/2Z |
| 3,140,736 | 7/1964 | Propst............................ | 144/2Z |
| 3,356,113 | 12/1967 | DelPerugia................... | 144/2Z |
| 3,364,960 | 11/1965 | Collins et al.................. | 143/32 |

*Primary Examiner*—Gerald A. Dost
*Attorneys*—Carl C. Batz and Andrew J. Beck

ABSTRACT: A tree-harvesting and processing method and device for harvesting standing trees, the device including a severing and crawler unit supported on a vehicle-mounted telescopic boom. The severing and crawler unit is adapted to continuously move the device longitudinally of a standing tree while severing the same into a plurality of sections and includes an endless chain drive having a plurality of fixed cutting and traction elements spaced therealong. Guide means operatively connected to the drive are provided to guide the severing and crawler unit along the longitudinal axis of a standing tree to continuously transversely cut the tree by alternate severing action by each of the cutting elements.

3,563,288

1

TREE-HARVESTING AND -PROCESSING DEVICES

BACKGROUND OF THE INVENTION

This invention generally relates to severing means and more particularly to severing means employed in tree harvesting and processing devices.

In Applicant's copending application by Sutherland, Ser. No. 692,749 filed Dec. 22, 1967, entitled "Tree Harvester," an apparatus is disclosed which includes a harvesting an processing device supported on a vehicle by a telescopic boom. The device comprises upper and lower sections, each including a hydraulically actuated tree shear and clamp for clamping the device to a standing tree and subsequently topping, delimbing, scoring and bucking a tree into pulpwood lengths or bolts. The upper and lower sections are relatively vertically movable by vertical hydraulic cylinders to facilitate a step-by-step or bolt-by-bolt harvesting action as the device descends a standing tree.

Operation of such a device may be generally summarized as follows. After initial positioning of the device to embrace the top of the tree to be harvested, the top clamp is actuated to grasp the tree and support the entire device thereon. The telescopic boom is placed in a float condition. Subsequently, the vertical cylinders may be extended whereby the lower section is forcefully lowered to an extend limited by maximum extension of these cylinders. In this manner, a portion of the tree embraced by the lower section during descent is delimbed and scored. The lower clamp is then set, the upper shear actuated to completely sever the top of the tree which is discarded, the upper clamp and shear opened by retraction of their respective hydraulic cylinders, and the vertical cylinders retracted to move the upper section to a lower portion of the tree adjacent the lower section of the device. Such tree-harvesting and -processing devices have been found and -processing be particularly advantageous because of their compactness when compared to the prior art devices which have generally been large, complex, expensive and so cumbersome that, as a practical matter, they could not be conveniently maneuvered in the forest to be harvested.

In operating the device of the type disclosed in the heretofore identified Sutherland application, to harvest trees of heights from 50 to 60 feet, the heretofore described sequence of operation is repeated from 12 to 14 times to sectionalize a standing tree into conventional 4 foot length bolts. The cycle of operation for severing each bolt entails extension and retraction of each of the upper and lower clamp cylinders, upper shear cylinders and the vertical cylinders. This intermittent but repetitive extension and retraction requires substantial cycle time, as well as hydraulic horsepower. Additionally, complex boom height controls are required to assure initial placement so that a standing tree is cut or bucked into a maximum number of sections or bolts of an even, preestablished length.

SUMMARY OF THE INVENTION

It is the general object of the present invention to provide a severing means as for a tree-harvesting and -processing apparatus offering the advantages of the heretofore identified Sutherland device but which minimizes and circumvents the problems heretofore noted.

In achieving this general object, the present invention provides a severing means adapted to transversely sever a member at spaced locations along its longitudinal axis, the severing means comprising a plurality of cutting elements and drive means movable along the longitudinal axis of the member for revolving the cutting elements about at least one axis transverse to the longitudinal axis of the member. Guide means operatively connected to the drive means are provided for clamping the member and for guiding the severing means along the longitudinal axis of the member to transversely sever the member by alternate cutting action by each cutting element.

2

BRIEF DESCRIPTION OF THE DRAWINGS

A better understanding of one embodiment of the present invention may be gained by reference to the accompanying drawings, in which.

DETAILED DESCRIPTION OF THE INVENTION

Figure 1:
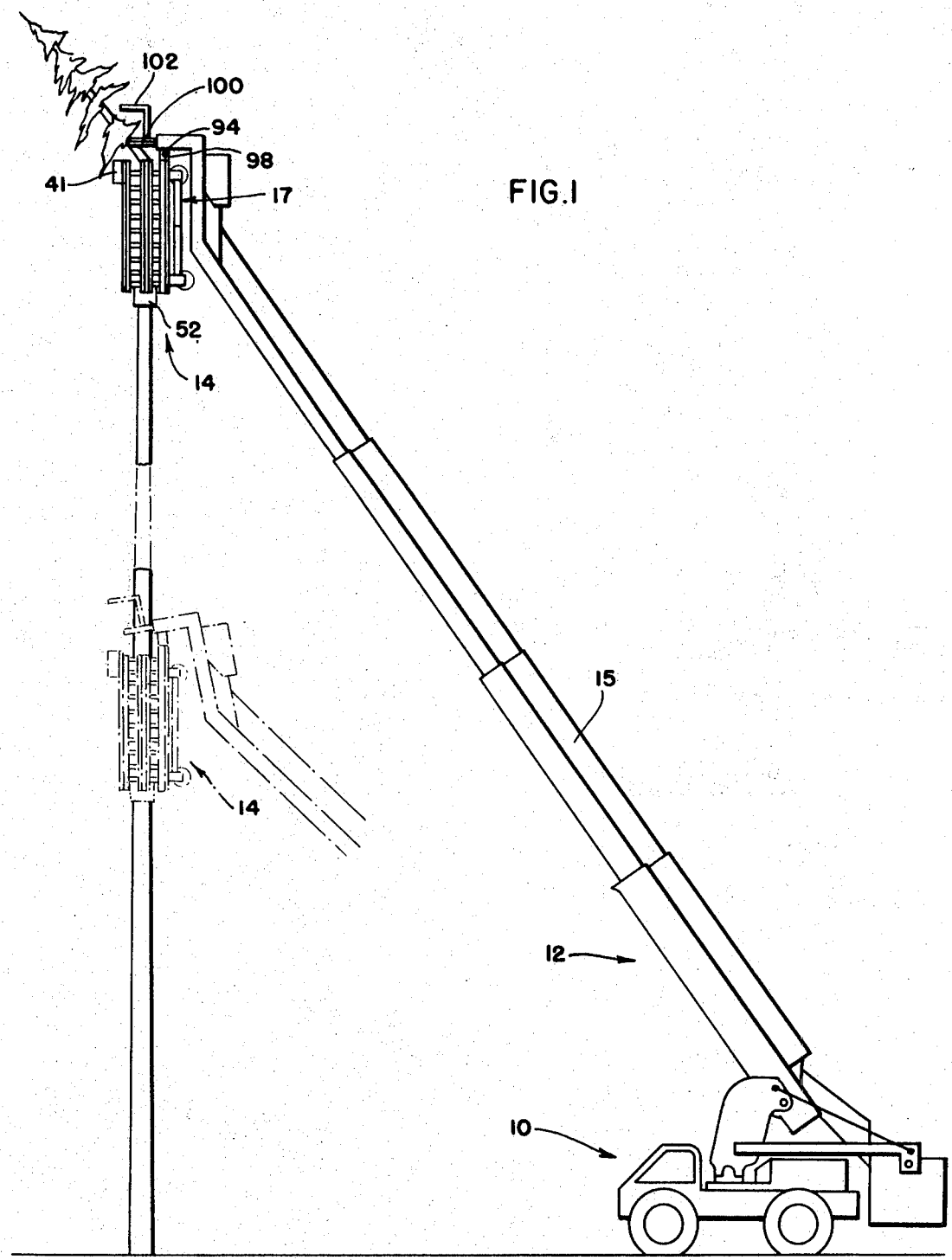
FIG. 1 is a schematic elevational view of a tree harvesting and processing device according to the present invention, positioned adjacent the top of a tree to be harvested and including a fragmentary showing in phantom line of the device after a few bolts have been harvested from the tree.

Referring in more detail to FIG. 1 of the drawings, a tree harvesting and processing device forming the basis of the present invention, such as disclosed in the heretofore identified Sutherland application, comprises a self-propelled, crane-type vehicle 10 on which an extensible boom 12 is mounted. The boom 12 may be of hydraulically actuated, telescopic type and is pivotally supported on a vehicle 10 for sweeping movement in vertical and horizontal directions for harvesting standing trees in a generally semicircular area about the front of the vehicle. A generally conventionally hydraulic control (not shown) may be provided to raise, lower, extend, retract, swing, hold or float the boom. On the upper or free end of the boom 12, a tree severing apparatus 14 is provided for topping, delimbing, scoring and severing or bucking a standing tree into pulpwood length or bolts. A telescopic chute or conveyor 15 is provided on boom 12 to direct severed or sheared bolts to a collection area or means.

Figure 2:
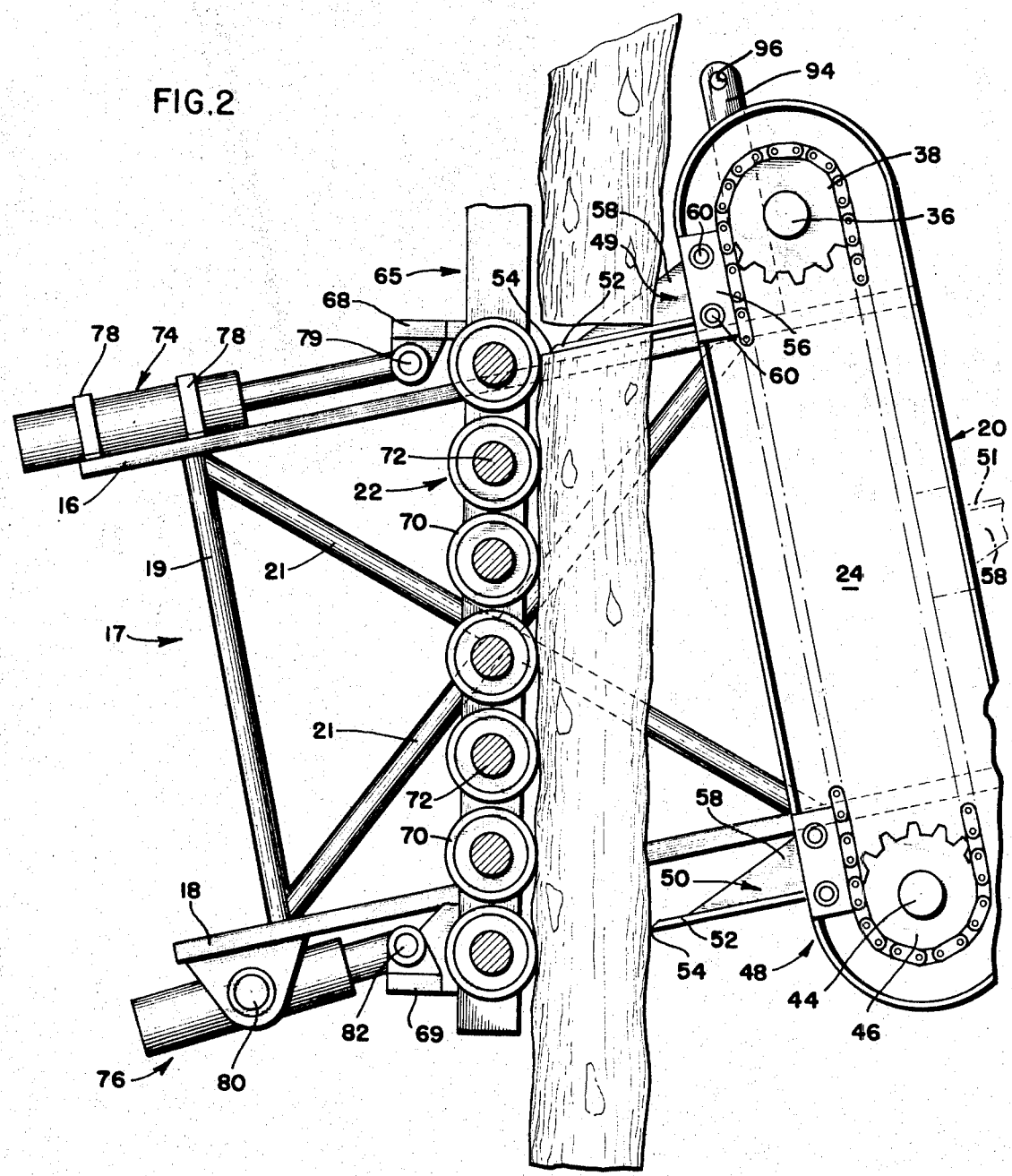
FIG. 2 is a schematic, fragmentary side view, partly in cross section of a tree severing and crawler assembly included in the device shown in FIG. 1 but positioned for the severing operation.
Figure 3:
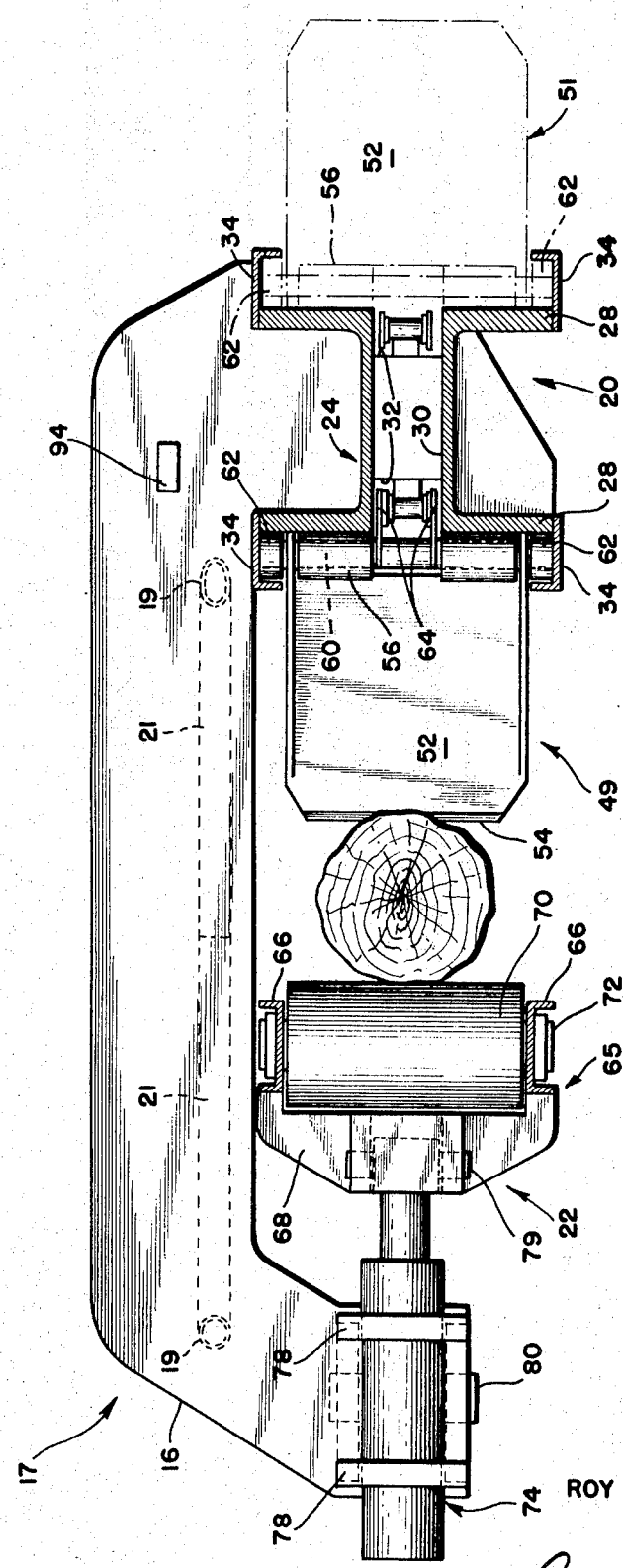
FIG. 3 is a schematic, fragmentary top view, partly in cross section of the severing and crawler assembly but positioned for travel up a standing tree.

Referring in more detail to FIGS. 2 and 3 of the drawings, the tree severing apparatus 14 according to the present invention generally comprises a main frame 17 including horizontally extending C-shaped upper and lower main frame members 16 and 18 rigidly connected together by vertical and diagonal brace members 19 and 21, respectively. Extending between the lateral ends of the main frame members 16 and 18 is tree severing and crawler assembly 20. The tree severing assembly 20 uniquely serves not only to sever a standing tree into a plurality of sections but also to propel the overall device up and down the tree. A guide roller assembly 22 extends between the other lateral ends of the main frame members 16 and 18 in opposed, laterally spaced relation to the tree severing assembly 20 so that the tree may be clamped therebetween.

The tree-severing and crawler assembly 20 comprises a vertically extending generally I-shaped severing assembly frame 24 fixedly connected between the upper and lower main frame members 16 and 18. The frame 24 comprises a pair of vertically extending laterally spaced flanges 28 connected together by a web 30 having recesses 32 at the lateral ends thereof. Positioned on the outboard lateral end of each flange 28 is a pair of L-shaped roller tracks 34.

As shown in FIG. 2, rotatably mounted on the upper end of the web 30 is a drive sprocket shaft 36 upon which is mounted a drive sprocket 38 which is adapted to be rotated by a reversible hydraulic motor 41 (FIG. 1) or the like, drivingly connected to one end of the shaft 36. An idler shaft 44 carrying an idler 46 is rotatably mounted on the lower end of the web 30. An endless chain drive or transmission band 48 is trained about the sprocket 38 and idler 46 and received in the recesses 32 in the web 30.

Fixedly connected at spaced locations along the drive chain 48 are a plurality of longitudinally spaced, transversely extending cutting and traction elements 49, 50, and 51. The cutting elements 49, 50 and 51 each comprise a generally horizontal extending blade 52 having a cutting edge 54 on the lateral outboard and thereof. The blades 52 have an effective length and width greater than the diameter of any tree which is likely to be harvested and include a blade base 56 on the inner ends thereof. A pair of laterally spaced, triangular-shaped gussets 58 are provided to reinforce the connection between each blade 52 and the blade base 56. A pair of blade shafts 60 extend through each blade base 58 and are provided with rotatably mounted rollers 62 at the lateral ends thereof. The rollers 62 are rotatably received in the roller tracks 34. A pair of blade brackets 64 extend from each blade base 58 and are connected to the endless chain 48.

The guide roller assembly 22 comprises a roller frame 65 including a pair of vertically extending, laterally spaced channel member 66 connected together at their upper and lower ends by generally C-shaped upper and lower ears 68 and 69. A plurality of vertically spaced rollers 70 extend between channel members 66 and are rotatably supported thereon by roller shafts 72. The guide roller frame 65 is supported on the upper and lower main frame members 16 and 18 by upper and lower roller frame hydraulic cylinder assemblies 74 and 76. The upper cylinder assembly 74 is rigidly connected at its cylinder end to the upper face of the upper main frame member 16 by brackets 78 and is pivotally connected at its rod end to the upper C-shaped ear 68 by a horizontally disposed pivot pin 79. The lower hydraulic assembly 76 is pivotally connected at its cylinder end by a trunnion 80 fixed to the lower face of the main frame member 18 for pivotal movement about a horizontal axis. The rod end of the lower cylinder assembly 76 is pivotably connected to the lower C-shaped ear 69 by a horizontally disposed pivot pin 82.

Extension of retraction of either of the roller frame cylinders 74 and 76 will cause the adjacent end of the guide roller assembly 22 to swing towards or away from the blade 52 as shown in FIG. 3 between fully closed and open positions. In the fully closed position contact is made between one of the rollers 70 and a blade 52. In the fully open position substantial lateral clearance exists between the blade 52 and the roller assembly 22 as is necessary to initially embrace a standing tree to be harvested.

To pivotally support the tree-severing apparatus 14 on the free end of the boom 12, a vertically extending mounting bracket 94 (FIG. 2) having a horizontally extending bore 96 in the upper end thereof is provided on the upper face of the upper frame member 18. A pivot pin 98 in the bore 96 pivotally connects the severing apparatus 14 to the boom 12. The bracket 94 is positioned to overlie the center of gravity of the serving apparatus 14 so that in any angular position of the boom 12, the severing apparatus 14 is free to pivot to maintain the cutting elements in a horizontal position suitable for severing a standing tree.

To facilitate delimbing and scoring a standing tree prior to bucking, the severing apparatus 14 includes a generally conventional hydraulically actuated delimbing and scoring blade 100 (FIG. 1) on the upper end thereof. The delimbing and scoring blade 100 may be of the type disclosed in the heretofore identified Sutherland application, including moveable arcuate, vertically extending delimbing blades adapted to closely embrace a standing tree to delimb the same as the device is moved longitudinally of the tree. Horizontally extending teeth may be included to score the bark of the tree during such movement.

A bolt kicker 102 of the type disclosed in the previously identified Sutherland application may be included to direct the fall of severed bolts to the conveyor 15.

Operation of a severing means to harvest standing trees in accordance with the present invention is as follows: Initially, the roller frame cylinders 74, 76 are fully retracted to provide maximum clearance between the severing assembly 20 and the roller assembly 22. The vehicle 10 and the boom 12 are positioned so that the severing apparatus 14 is adjacent the ground and embraces the base of a standing tree. The lowermost cutting element 50 is positioned at the desired tree stump height. At this point, both roller frame hydraulic cylinders 74, 76 are partially extended until the rollers 70 and a pair of cutting elements 49, 50 clamp the tree therebetween. So positioned, the severing assembly frame 24 is in a generally vertical position parallel to the longitudinal axis of the tree which is grasped between the rollers 70 and the cutting elements 49 and 50 with the blades 52 being slightly embedded therein. The boom 12 is placed in a float condition. The hydraulic motor 42 is then actuated to revolve or rotate the endless chain 48 in a counterclockwise direction as shown in FIG. 2. Such counterclockwise movement causes the severing apparatus to "crawl" up a standing tree in much the same manner that a track or crawler-type tractor crawls along the ground. Tree delimbing and scoring may be performed as the apparatus ascends the tree. Upon reaching an elevation adjacent the upper end of the standing tree wherein the tree topping operation is to be performed, the motor 42 is deactivated and the upper roller frame cylinder 74 is fully extended to pivot the upper end of the severing assembly 20 towards the roller assembly 22 thereby causing the upper cutting element 49 to transversely sever the tree at its point of contact. The top of the tree is discarded. The lower cylinder 76 is maintained in its partially extended position and the severing frame 24 assumes an inclined position. The motor 42 is then reactivated in a reverse direction to rotate the endless chain 48 in a clockwise direction as shown in FIG. 2 whereby the severing apparatus continuously descends the standing tree. Such descent causes each of the cutting elements 49, 50 and 51 to follow a path inclined to the longitudinal axis of the tree and causes these elements to make discreet cuts spaced along the longitudinal axis of the tree to sever bolts therefrom. Each bolt is directed to the conveyor 15 by the kicker 102. As the lower cutting element 50 reaches its initial position at the desired stump height, the lower cylinder 76 is fully extended to sever the last bolt from the stump. The motor 42 is then deactivated as the last bolt is ejected into the chute or conveyor 15. The cylinders 74, 76 are returned to a fully retracted position simultaneously as the operator approaches the next tree to be harvested.

It will be seen that the cutting elements cut independently of each other. A separate cut is commenced as each cutting element is rotated to a point adjacent the inner lower end of the frame 24, and contact with the tree is made in the position of cutting element 50 as shown in FIG. 2. Further rotation of the endless chain 48 causes the cutting element to move in a inwardly inclined path and to become further embedded in the tree until the tree is completely severed by movement of a cutting element to the position shown in FIG. 2 of the upper cutting element 49.

It should be noted that cutting by at least one of the cutting elements is continuously performed as the severing apparatus descends the tree, as opposed to the intermittent cutting operation of the prior art devices. Such continuous cutting is highly advantageous in that the cycle time and control problems may be reduced because the need for repeated extension and retraction of a hydraulic cylinder or the like to cause each transverse cut, is eliminated. Additionally, because the boom 12 is in a float condition with the weight of the severing apparatus supported entirely on the standing tree, the apparatus weight aids in the descent and cutting operation.

Further, the instant severing apparatus is particularly beneficial in a tree harvesting environment in that it eliminates the need for complex boom height controls to assure that initial placement adjacent the top of a standing tree is correct for securing a maximum number of sections or bolts of an even preestablished length. In this regard, it is noted that the prior art devices required complex controls to aid in initially positioning the severing apparatus adjacent the top of a tree at an exact elevation equaling the desired bolt length (usually 4 feet in a pulpwood operation) multiplied by the maximum available number of bolts. Without such controls the last bolt severed adjacent the tree stump might otherwise be of an undesirable, uneven length. Such problems are eliminated by utilizing the present invention wherein the traction means also function as the severing means and which descends a standing tree by contacting and severing the tree at the same points of contact made in ascending the tree.

While in the foregoing description, reference has been made to but one specific embodiment of the present invention, it should be understood that the structure and operation thereof may be varied by those skilled in the art without departing from the spirit and scope of the present invention which is to be defined by the following claims.

I claim:

1. A severing device adapted to intermittently sever a member transversely of its longitudinal axis, said severing device comprising:
    a plurality of spaced cutting elements, each cutting element having a cutting edge oriented to intermittently sever the member transversely of the longitudinal axis of the member; and
    drive means connected to said cutting elements for translating the device in a direction parallel to the longitudinal axis of the member and for revolving said elements about at least one axis transverse to the longitudinal axis of the member.

2. A severing means according to claim 1 wherein said drive means includes an endless band transmission means, said cutting elements being spaced along said endless band.

3. A severing means according to claim 2 wherein said endless band transmission means includes a longitudinal axis and said severing means further includes guide means for maintaining the longitudinal axis of said endless band transmission means in an inclined position relative to the longitudinal axis of the member to be severed.

4. A severing means according to claim 3 wherein said guide means includes guide motor means for moving said endless band transmission means from a position wherein the longitudinal axis thereof is generally parallel to the longitudinal axis of the member to said inclined position.

5. A severing means according to claim 4 wherein said endless band transmission means includes an endless chain trained over a sprocket on one end and an idler on the other end, a transmission frame rotatably mounting said sprocket and idler, and drive motor means for driving said sprocket.

6. A severing device according to claim 5 further including a main frame supporting said endless band transmission means, said guide means including roller means moveably mounted on said main frame, said roller means being adapted to contact the member to be severed, said endless band transmission means being mounted on said main frame in opposed spaced relation to said roller means for positioning the member to be severed between said endless band transmission means and said roller means, and said guide motor means includes fluid cylinder means adjacent either end of said transmission frame and connected to said main frame for moving one end of said transmission frame relatively closer to said roller means than the other end thereof.

7. A method of severing a member at discreet spaced locations along its longitudinal axis by utilizing a revolving cutter having a plurality of cutting elements thereon, said method comprising:
    positioning the cutter so that at least one cutting element contacts the member at a first location where severing is desired;
    severing the member at said first location; and
    revolving the cutter to bring other cutting elements into contact with the member at other discreet spaced locations along the longitudinal axis of the member to sever the same at said discreet locations and for translating the cutter in a direction parallel to the longitudinal axis of the member.

8. A method of severing a member according to claim 7 wherein the member is initially severed at said first location without revolving the cutter.

9. A severing device adapted to transversely sever a member at a plurality of locations along the longitudinal axis of the member, said severing device comprising:
    a plurality of cutting elements, each cutting element adapted to independently make discreet cuts in the member to transversely sever the same at spaced locations; and
    drive means connected to said cutting elements for translating the device in a direction parallel to the longitudinal axis of the member and for moving said elements so that at least one of said elements is transversely cutting the member throughout the interval of translation of the device.

10. A tree-harvesting device for severing a standing tree at spaced locations along its longitudinal axis, said device comprising:
    a plurality of spaced cutting elements, each cutting element having an effective length in the direction of cut at least as great as a diameter of the tree to be harvested; and
    drive means connected to said cutting elements for translating the device along the standing tree and for revolving said elements about at least one axis transverse to the longitudinal axis of the tree.

11. A tree-harvesting device according to claim 10 wherein said drive means includes an endless chain drive means, said cutting elements spaced along said endless chain drive means.

12. A tree-harvesting device according to claim 11 wherein said endless chain drive means includes a longitudinal axis, and said device further includes guide means for guiding the endless chain drive means in a position wherein said longitudinal axis thereof is parallel to the longitudinal axis of the standing tree, and fluid motor means for moving said endless chain drive means to a position wherein its longitudinal axis is inclined relative to the longitudinal axis of the tree.

13. A tree-harvesting device according to claim 12 further including a main frame supporting said endless chain drive means, said guide means including a plurality of rollers rotatably mounted on a roller frame, said roller frame laterally spaced from said endless chain drive means and moveably connected to said main frame, said fluid motor means including a pair of vertically spaced, upper and lower fluid cylinders, each connected between said main frame and said roller frame for gripping a standing tree between said rollers and said cutting elements and for moving one end of said endless chain drive means closer to said rollers than the other end thereof.

14. A tree-harvesting device according to claim 13 wherein said main frame is supported on a telescopic boom pivotally mounted on a vehicle for pivotal movement in vertical and horizontal planes.

15. A method of harvesting standing trees by severing the same at spaced locations along the longitudinal axis thereof by utilizing a revolving cutter having a plurality of cutting elements thereon, said method comprising:
    positioning the cutter adjacent the base of a standing tree for revolving the cutter about at least one axis transverse to the longitudinal axis of the tree;
    moving the cutter up the tree to a point adjacent the top thereof by revolving the cutter in a first direction to bring each of the cutting elements into contact with the tree;
    severing the top of the tree; and
    revolving the cutter in a second direction to move the same down the tree and sever the standing tree at spaced locations along its longitudinal axis.

16. A method of harvesting standing trees according to claim 15 wherein said cutter is clamped to said tree during movement of the cutter and the weight thereof is supported on the tree.

17. A method of harvesting standing trees according to claim 16 wherein said cutter further includes delimbing means, said method further including delimbing the tree during upward movement of the cutter.

18. A method of harvesting a standing tree by severing the same into a plurality of longitudinally extending sections, by utilizing a cutter including a plurality of cutting elements which revolve about at least one axis, said method comprising: continuously revolving said cutting elements and thereby moving the cutter longitudinally of the tree while simultaneously continuously transversely cutting the tree to sever the same at discreet longitudinally spaced locations.